(12) United States Patent
Hogendoorn et al.

(10) Patent No.: US 11,609,110 B2
(45) Date of Patent: Mar. 21, 2023

(54) ULTRASONIC FLOWMETER, METHOD FOR OPERATING AN ULTRASONIC FLOWMETER, MEASURING SYSTEM AND METHOD FOR OPERATING A MEASURING SYSTEM

(71) Applicant: Krohne AG, Basel (CH)

(72) Inventors: Cornelis Johannes Hogendoorn, Spijk (NL); Jan Teunis Aart Pors, Oud-Beijerland (NL); Olaf Jean Paul Bousché, Dordrecht (NL)

(73) Assignee: KROHNE AG, Basel (CH)

( * ) Notice: Subject to any disclaimer, the term of this patent is extended or adjusted under 35 U.S.C. 154(b) by 202 days.

(21) Appl. No.: 16/828,994

(22) Filed: Mar. 25, 2020

(65) Prior Publication Data
US 2020/0355532 A1  Nov. 12, 2020

(30) Foreign Application Priority Data

Mar. 29, 2019  (DE) .................. 10 2019 108 189.0

(51) Int. Cl.
*G01F 1/74*  (2006.01)
*G01F 1/667*  (2022.01)
(Continued)

(52) U.S. Cl.
CPC ................ *G01F 1/74* (2013.01); *G01F 1/66* (2013.01); *G01F 1/662* (2013.01); *G01F 1/667* (2013.01);
(Continued)

(58) Field of Classification Search
CPC ..... G01F 1/74; G01F 1/66; G01F 7/00; G01N 29/02; G01N 29/024; G01N 29/222; G01N 29/4454
See application file for complete search history.

(56) References Cited

U.S. PATENT DOCUMENTS 5,719,329 A   2/1998  Jepson et al.
9,513,148 B2  12/2016  Hogendoorn
(Continued)

FOREIGN PATENT DOCUMENTS

DE  102013018802 A1  6/2014
WO    2005040732 A1  5/2005

*Primary Examiner* — Benjamin R Schmitt
(74) *Attorney, Agent, or Firm* — David S. Safran; Calderon Safran & Cole P.C.

(57) ABSTRACT

An ultrasonic flowmeter having a measuring tube, a control unit, at least one first ultrasonic measuring unit and a second ultrasonic measuring unit, the measuring tube having a measuring tube interior and a measuring tube longitudinal axis, wherein each of the ultrasonic measuring units is arranged on the measuring tube, wherein each ultrasonic measuring unit has a first ultrasonic transducer and a second ultrasonic transducer, the first and the second ultrasonic transducers spanning a sound measuring section with a sound axis. The sound measuring section and the sound axis penetrate the measuring tube interior for carrying out ultrasonic measurements. To provide an ultrasonic flowmeter for reliable measurement of a multi-phase medium, the sound axis of the first ultrasonic measuring unit and the sound axis of the second ultrasonic measuring unit span a sound measuring plane which extends substantially parallel to the longitudinal axis of the measuring tube.

8 Claims, 3 Drawing Sheets

(51) Int. Cl.
*G01N 29/024* (2006.01)
*G01N 29/22* (2006.01)
*G01F 1/66* (2022.01)
*G01N 29/44* (2006.01)
*G01F 1/716* (2006.01)

(52) U.S. Cl.
CPC ......... *G01N 29/024* (2013.01); *G01N 29/222* (2013.01); *G01F 1/716* (2013.01); *G01N 29/4454* (2013.01)

(56) References Cited

U.S. PATENT DOCUMENTS

| | | |
|---|---|---|
| 2010/0107777 A1 | 5/2010 | Ao |
| 2012/0125122 A1 | 5/2012 | Gottlieb et al. |
| 2015/0042206 A1 | 2/2015 | Nguyen et al. |
| 2015/0198470 A1 | 7/2015 | Brown et al. |
| 2015/0377691 A1 | 12/2015 | Ceglia et al. |
| 2016/0265954 A1 | 9/2016 | Bachmann et al. |
| 2018/0010943 A1 | 1/2018 | Xu et al. |
| 2018/0110913 A1 | 4/2018 | Loderer et al. |
| 2018/0321067 A1 | 11/2018 | Kroemer et al. |

ULTRASONIC FLOWMETER, METHOD FOR OPERATING AN ULTRASONIC FLOWMETER, MEASURING SYSTEM AND METHOD FOR OPERATING A MEASURING SYSTEM

BACKGROUND OF THE INVENTION

Field of the Invention

The invention relates to an ultrasonic flowmeter having a measuring tube, a control means and at least one first and a second ultrasonic measuring means, wherein the measuring tube has a measuring tube interior and a measuring tube longitudinal axis, wherein each of the ultrasonic measuring units is arranged on the measuring tube, wherein each ultrasonic measuring unit comprises a first and a second ultrasonic transducer, wherein the first and second ultrasonic transducers of each ultrasonic measuring unit span a sound measuring section with a sound axis and the sound measuring section and the sound axis penetrate the measuring tube interior and wherein the control unit is designed for carrying out ultrasonic measurements with the ultrasonic measuring units. In addition, the invention relates to a method for operating such an ultrasonic flowmeter.

Furthermore, the invention relates to a measuring system with an ultrasonic flowmeter designed as described above and a multi-phase flowmeter as well as to a method for operating such a measuring system.

Description of the Related Art

In many application areas where media are transported through pipelines, it is of interest to determine the flow rate, the volume flow or the mass flow and/or also the velocity of the medium in detail.

The medium to be measured often has an irregular mixture of a liquid and/or gaseous and/or solid phase. This makes the determination of the individual phases particularly demanding in terms of process technology.

Different measuring principles are known for the detection of the aforementioned individual phases of a multi-phase medium.

The ultrasonic flowmeter is a measuring device for determining the flow velocity of a liquid and/or gaseous medium.

As explained above, such a measuring device has at least one first ultrasonic measuring unit with two ultrasonic transducers, wherein the ultrasonic transducers frequently function as ultrasonic transmitters and ultrasonic receivers. The ultrasonic transducers are arranged on the measuring tube in such a manner that the measurement signal emitted by the ultrasonic transmitter is received by the ultrasonic receiver after passing through the sound measuring section.

In order to determine the flow velocity, the measurement signal is transmitted along the sound measuring section both in the direction of flow of the medium and against the flow into the medium or received by the respective ultrasonic receiver. Due to the entraining effect, the measurement signals emitted in the direction of flow have a shorter transit time than signals emitted against the flow. The flow velocity of the medium can be determined from this difference in transit time.

SUMMARY OF THE INVENTION

The object of the invention is to provide an ultrasonic flowmeter and a method for operating a corresponding ultrasonic flowmeter for the reliable measurement of a multi-phase medium. In addition, the object of the invention is to provide a measurement system with an ultrasonic flowmeter and a multi-phase flowmeter and a method for operating a corresponding measurement system.

According to a first teaching of the present invention, the object described above is achieved by an ultrasonic flowmeter mentioned in the introduction in that the sound axis of the first ultrasonic measuring unit and the sound axis of the second ultrasonic measuring unit span a sound measuring plane which runs essentially parallel to the longitudinal axis of the measuring tube.

In the context of the present invention, the longitudinal axis of the measuring tube runs through the center of the cross section of the measuring tube cross section.

By the sound measuring plane being essentially parallel to the longitudinal axis of the measuring tube, this means that the angle between the longitudinal axis of the measuring tube and the sound measuring plane is less than ±45°, in particular less than ±30°, preferably less than ±15°, particularly preferably less than ±5°. The sound measuring plane preferably does not intersect the longitudinal axis of the measuring tube in the area of the ultrasonic transducers. According to this design, the first and second ultrasonic measuring units are arranged above or below the longitudinal axis of the measuring tube. Moreover, the angle refers to an intersection of the sound measuring plane with the longitudinal axis of the measuring tube, which can also lie outside the ultrasonic flowmeter. According to a particularly preferred design, the sound measuring plane runs parallel to the longitudinal axis of the measuring tube.

This design of the ultrasonic flowmeter according to the invention has the advantage, on the one hand, that the measurement by the first ultrasonic measuring unit can be checked by a second ultrasonic measuring unit and/or the measurement can be additionally evaluated by the second ultrasonic measuring unit and/or that in the event that one ultrasonic measuring unit fails at least temporarily, the other ultrasonic measuring unit ensures the measurement of the medium.

In addition, the ultrasonic measuring units are arranged on the measuring tube in such a manner that the two sound axes measure the medium within a sound measuring plane which is aligned substantially parallel to the longitudinal axis of the measuring tube. This has the advantage that especially when the sound measuring plane does not intersect the longitudinal axis of the measuring tube in the area of the ultrasonic transducers, the redundant measurement of the flowing medium takes place essentially within the same plane of the flow cross section.

Since this sound measuring plane is aligned essentially parallel to the longitudinal axis of the measuring tube, it is also ensured that the same phase is measured by the two ultrasonic measuring units during operation. Apart from irregular surge flows, exactly one liquid or gaseous phase, for example, is arranged in one plane of the measuring tube or the flow cross section for multi-phase media. The ultrasonic measuring units are particularly preferred arranged on the measuring tube in such a manner that they measure the gaseous phase of the flowing medium.

According to one design, the ultrasonic transducers are arranged in such a manner that the sound axis of the first ultrasonic measuring unit and the sound axis of the second ultrasonic measuring unit cross each other. In this case, the ultrasonic transducers measure the flowing medium in the same partial area in relation to the longitudinal axis of the measuring tube. Alternatively, the ultrasonic transducers can be arranged one behind the other in relation to the longitudinal axis of the measuring tube. For example, the sound axes can be aligned parallel to each other or the first sound axis and the second sound axis together can form a V-shape. It is also conceivable that the sound axes have a reflection on the inner wall of the measuring tube.

It is particularly preferred when the sound measuring sections or the sound axes of the first and/or the second ultrasonic measuring unit do not have any reflection on the inner wall of the measuring tube.

According to a further design, the sound measuring plane lies above the longitudinal axis of the measuring tube in relation to the earth gravitational field vector. This design takes into account that the gaseous phase flows at the top in media with different phases. The arrangement of the sound measuring plane above the longitudinal axis of the measuring tube ensures that primarily the gaseous phase of the flowing medium is measured.

According to a second teaching of the present invention, the object described in the introduction is achieved by a method mentioned in the introduction for operating an ultrasonic flowmeter by flowing a medium with at least one liquid and a gaseous phase through the measuring tube, that a first sound velocity of a first measurement signal is determined via the sound measuring section of the first ultrasonic measuring unit and is assigned to the gaseous phase if the first sound velocity is below a limiting sound velocity, that a second sound velocity of a second measurement signal is determined via the sound measuring section of the second ultrasonic measuring unit and is assigned to the gaseous phase if the second sound velocity is below a limiting sound velocity, and that, if at least one of the sound velocities is assigned to the gaseous phase, a flow velocity of the gaseous phase is determined from the at least one sound velocity.

The limiting sound velocity is preferably set in such a manner that the limiting sound velocity lies between the sound velocity of gases and the sound velocity of liquids. The limiting sound velocity can be redefined before the measurement of a new medium, depending on the composition of the medium.

By comparing the first and the second measured sound velocity with the limiting sound velocity, it can be ensured that only the flow velocity of the gaseous phase is determined. Thus, the method according to the invention is suitable for the reliable determination of the flow velocity of the gaseous phase in multi-phase media.

According to a design of the method for operating an ultrasonic flowmeter, the flow velocity is determined from both sound velocities if both sound velocities are assigned to the gaseous phase.

For example, a first flow velocity can be determined from the first sound velocity and a second flow velocity from the second sound velocity. Subsequently, the two flow velocities can be optionally averaged. Alternatively, the first sound velocity and the second sound velocity can also be averaged beforehand and then the flow velocity can be determined from the average value. Alternatively, the separately determined flow velocities and/or the sound velocities can be compared and/or linked by another operation.

It is also possible to measure the sound velocities and/or the flow velocities over a defined period and then to average the values over this defined period.

The flow velocity of the gaseous phase of the multi-phase medium determined in this manner can, for example, be output via a display unit and/or an interface and/or stored in a memory unit.

According to a next design, the method for operating an ultrasonic flowmeter is carried out a first and a second time according to the next design, wherein at least one sound velocity is assigned to the gaseous phase during the first execution, wherein none of the sound velocities are assigned to the gaseous phase during the second execution, and wherein a flow velocity of the gaseous phase is determined from the at least one sound velocity of the first execution.

This design of the method ensures that if, for example, the liquid phase of the multi-phase medium temporarily obscures all ultrasonic transducers, so that the flow velocity of the gaseous phase temporarily cannot be measured, the value of the flow velocity is then determined from the previously measured sound velocity. In this respect, short-term blockages of both ultrasonic measuring units, for example in the event of liquid surges, can be bridged by the control device.

According to one design, a time interval and/or a number of measurements are set within which the flow velocity maintains the last measured value or is calculated from the last determined sound velocity, provided that neither the first nor the second measurement signal is assigned to the gaseous phase. Only then does the control device preferably report that no gaseous phase can be measured, for example by setting the value of the flow velocity to 0.

According to a further design, information about the flow regime is determined using at least one property of the first and/or the second measurement signal. In detail, this means that at least one property of the first and/or the second measurement signal indicates a turbulent or laminar flow profile. One such property of a measurement signal is, for example, the amplitude of the measurement signal or the attenuation of the signal amplitude when passing through the medium and/or the phase of the measurement signal and/or the temporal change in the velocity of sound and/or the signal to noise ratio of the measurement signal.

According to a design of the method, the property of the first and/or the second measurement signal can be evaluated independently of whether the sound velocity of the first and/or the second measurement signal is assigned to a gaseous phase.

Alternatively, the property of the first and/or the second measurement signal is only evaluated if the sound velocity is assigned to a gaseous phase.

According to a next design, the presence of surges in the measuring tube is determined using the first and/or second sound velocity.

For example, the frequency of blocking of the first and/or the second ultrasonic measuring unit by a liquid phase can be evaluated.

In addition, by comparing the frequency of blocking of the first ultrasonic measuring unit and the frequency of blocking of the second ultrasonic measuring unit, further information about the spatial distribution of the surges, i.e., the liquid surges, can be obtained.

All further information about the medium can also be output via a display unit and/or an interface and/or stored in a storage unit.

In addition, information about the composition of the gaseous phase can be determined from the sound velocity of the first and/or the second measurement signal. If, in particular, the operating parameters, such as pressure and/or temperature within the measuring tube are known, the components of the gaseous phase can be inferred from the measured magnitude of the sound velocity.

According to a third teaching of the present invention, the object described in the introduction is achieved by a measuring system mentioned above with an ultrasonic flowmeter and a multi-phase flowmeter in that the ultrasonic flowmeter is configured according to one of the designs described above. With regard to the respective advantages of the individual designs, reference is made to the above explanations.

The application range of the multi-phase flowmeter or of such a system can be extended and/or the measuring accuracy increased by means of the measuring system according to the invention, in which the ultrasonic flowmeter is designed in such a manner that it reliably detects, in particular, the flow velocity of a phase, in particular the gaseous phase of a multi-phase medium. In particular, such a system can also be used under extreme conditions for the multi-phase flowmeter. Such conditions are, for example, particularly high flow velocities or a high pressure within the measuring tube.

According to an advantageous further development, the multiphase flowmeter is a nuclear magnetic flowmeter.

Alternatively, the multi-phase flowmeter can also be designed as an ultrasonic flowmeter, which, due to the arrangement of the ultrasonic transducers, is designed, for example, for the detection or determination of the flow velocity of the liquid phase of a multi-phase medium.

According to one design of the measuring system, the ultrasonic flowmeter is arranged downstream of the multi-phase flowmeter.

Alternatively, the ultrasonic flowmeter can also be arranged upstream of the multi-phase flowmeter in the direction of flow.

If the ultrasonic flowmeter and the multi-phase flowmeter are arranged one behind the other, the diameters of the respective measuring tubes may differ.

It is also possible that the ultrasonic flowmeter and the multi-phase flowmeter are combined on one section of the measuring tube.

According to a further design, the measuring system has a central processing unit which evaluates the measurement results of the multi-phase flowmeter and the ultrasonic flowmeter. Such a central processing unit can be integrated in the multi-phase flowmeter or in the ultrasonic flowmeter or can be designed as a separate processing unit.

According to a fourth teaching of the present invention, the above-mentioned object is achieved by a method for operating a measuring system described above in that a proportion of the liquid phase and optionally a flow velocity of the gaseous phase are determined from the multi-phase flowmeter, that a flow velocity of the gaseous phase is determined by the ultrasonic flowmeter, that the proportion of the gaseous phase is determined using the proportion of the liquid phase, and that, if the flow velocity of the gaseous phase determined by the ultrasonic flowmeter is above a limiting flow velocity, the flow, in particular the volume flow and/or the mass flow, of the gaseous phase is determined using the flow velocity of the gaseous phase determined by the ultrasonic flowmeter and the proportion of the gaseous phase.

According to the invention, the measurement results of different measuring instruments are combined in order to determine further properties of the flowing medium. In this case, the method according to the invention allows in detail to reliably determine the flow of the gaseous phase of a multi-phase medium even under difficult conditions, such as very high flow velocities. This is not possible by the multi-phase flowmeter or by the ultrasonic flowmeter alone.

The limiting flow velocity of the gaseous phase is preferably determined taking into account the measuring range of the multi-phase flowmeter and/or the medium to be detected.

In this respect, the flow, i.e., the volume flow or the mass flow, of the gaseous phase is determined according to the invention on the basis of the proportion of the gaseous phase in the total flow and the flow velocity of the gaseous phase determined by the multi-phase flowmeter and/or the ultrasonic flowmeter.

For example, the following formula is used to determine the flow rate of the gaseous phase:

$$Q_{gas}=A\cdot(1-\alpha)\cdot v_{gas},$$

where A is the cross-section of the measuring tube, $\alpha$ is the proportion of the liquid phase determined by the multi-phase flowmeter and $v_{gas}$ is the flow velocity of the gaseous phase.

When determining the proportion of the liquid phase and/or the proportion of the gaseous phase and/or the flow rate of the gaseous phase, the other properties of the medium determined by the ultrasonic flowmeter, as described above, can also be taken into account according to a preferred design.

A further feature of the method for operating a measuring system is that, if the flow velocity of the gaseous phase determined by the ultrasonic flowmeter is below the limiting flow velocity, the flow of the gaseous phase is determined using the flow velocity of the gaseous phase determined by the multi-phase flowmeter and the proportion of the gaseous phase.

A next design of the method is characterized in that if the flow velocity of the gaseous phase determined by the ultrasonic flowmeter is below the limiting flow velocity, the flow of the gaseous phase is determined using the flow velocities of the gaseous phase determined by the ultrasonic flowmeter and the multi-phase flowmeter and the proportion of the gaseous phase.

According to a further design of the method, the pressure within the multi-phase flowmeter is determined and the flow of the gaseous phase is determined using at least the flow velocity of the gaseous phase determined by the ultrasonic flowmeter when the pressure within the multi-phase flowmeter exceeds a limiting pressure.

According to this design, the flow velocity determined by the ultrasonic flowmeter is used not only at very fast gas velocities but also at high pressures to determine the flow velocity or the flow of the gaseous phase.

In addition to gas velocity and pressure within the multi-phase flowmeter, the use of ultrasonic flowmeter readings may also depend on other operating parameters, such as temperature. In addition, the gaseous phase flow velocity measured by the ultrasonic flowmeter can also be continuously sent to the multi-phase flowmeter and/or a central processing unit to determine the flow of the gaseous phase.

According to another advantageous design, the ultrasonic flowmeter carries out one of the methods described above.

As a result, the measuring system according to the invention can improve the detection of a multi-phase medium flowing through a measuring tube.

In detail, there is now a plurality of possibilities for designing and further developing the ultrasonic flowmeter according to the invention, the method for operating an ultrasonic flowmeter, the measuring system according to the invention and the method for operating a measuring system as will be apparent from the following description of preferred embodiments with reference to the accompanying drawings.

DETAILED DESCRIPTION OF THE DRAWINGS

Figure 1:
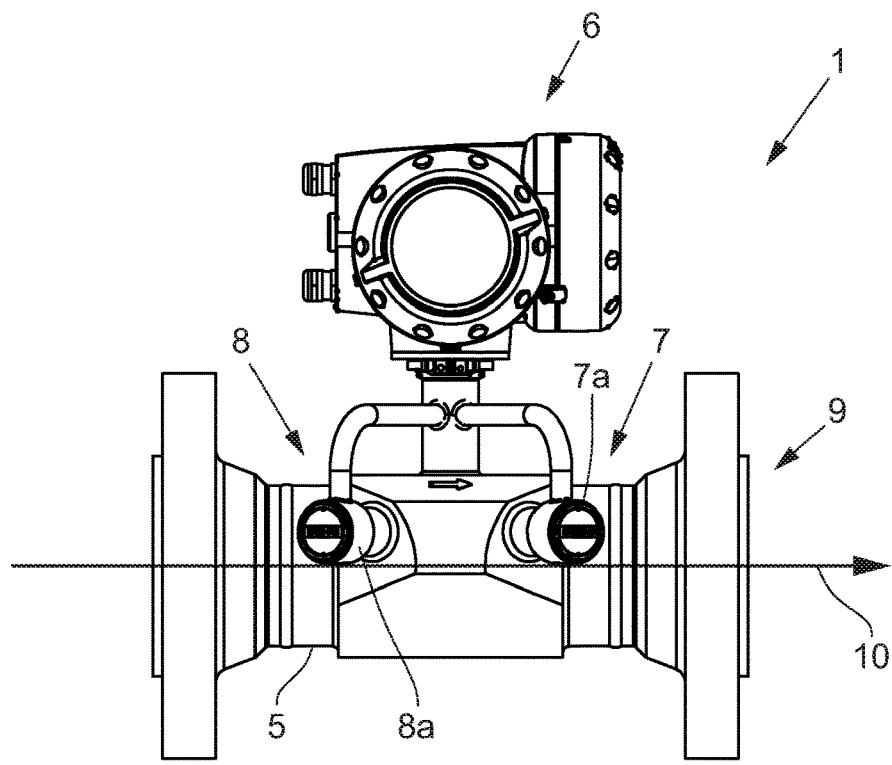
FIG. 1 is a side view of first embodiment of an ultrasonic flowmeter according to the invention.

FIG. 1 shows a first embodiment of an ultrasonic flowmeter 1 with a measuring tube 5, with a control device 6 and with a first ultrasonic measuring unit 7 and with a second ultrasonic measuring unit 8.

The measuring tube 5 has a measuring tube interior 9 and a measuring tube longitudinal axis 10, wherein the measuring tube longitudinal axis 10 runs through the center of the measuring tube cross section.

Figure 2:
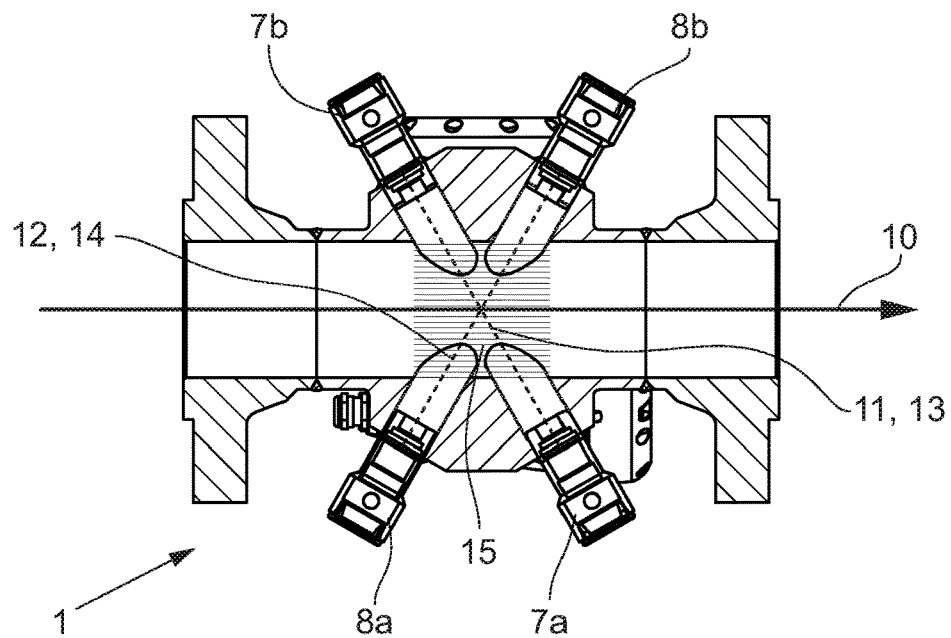
FIG. 2 is a view of the first embodiment of an ultrasonic flowmeter according to the invention in cross section from above.

The first ultrasonic measuring unit 7 has a first ultrasonic transducer 7a and a second ultrasonic transducer 7b, which is hidden in FIG. 1, but shown in FIG. 2. The second ultrasonic measuring unit 8 has a first ultrasonic transducer 8a and a second ultrasonic transducer 8b, which is also hidden in FIG. 1, but shown in FIG. 2. The arrangement of the four ultrasonic transducers 7a, 8a, 7b, 8b can be seen in FIG. 2.

FIG. 1 further shows that the ultrasonic transducers 7a, 8a, are arranged above the measuring tube longitudinal axis 10 (the same being true for the ultrasonic transducers 7b, 8b which are on the same plane as can be seen from FIG. 2), so that the ultrasonic flowmeter shown is particularly suitable for the reliable detection or determination of the flow velocity of a gaseous phase of a multi-phase medium.

FIG. 2 shows the first embodiment of the ultrasonic flowmeter 1 in which the first ultrasonic transducer 7a and the second ultrasonic transducer 7b of the first ultrasonic measuring unit 7 span a first sound measuring section 11 with a first sound axis 13. The first ultrasonic transducer 8a and the second ultrasonic transducer 8b of the second ultrasonic measuring unit 8 span a second sound measuring section 12 with a second sound axis 14.

The sound axis 13 of the first ultrasonic measuring unit 7 and the sound axis 14 of the second ultrasonic measuring unit 8 together span a sound measuring plane 15, which, in the embodiment shown, runs parallel to the measuring tube longitudinal axis 10.

In that the sound measurement plane 15 is aligned parallel to the longitudinal axis 10 of the measuring tube, it is ensured that the same phase, preferably the gaseous phase, is measured redundantly when measuring a multi-phase medium.

Figure 3:
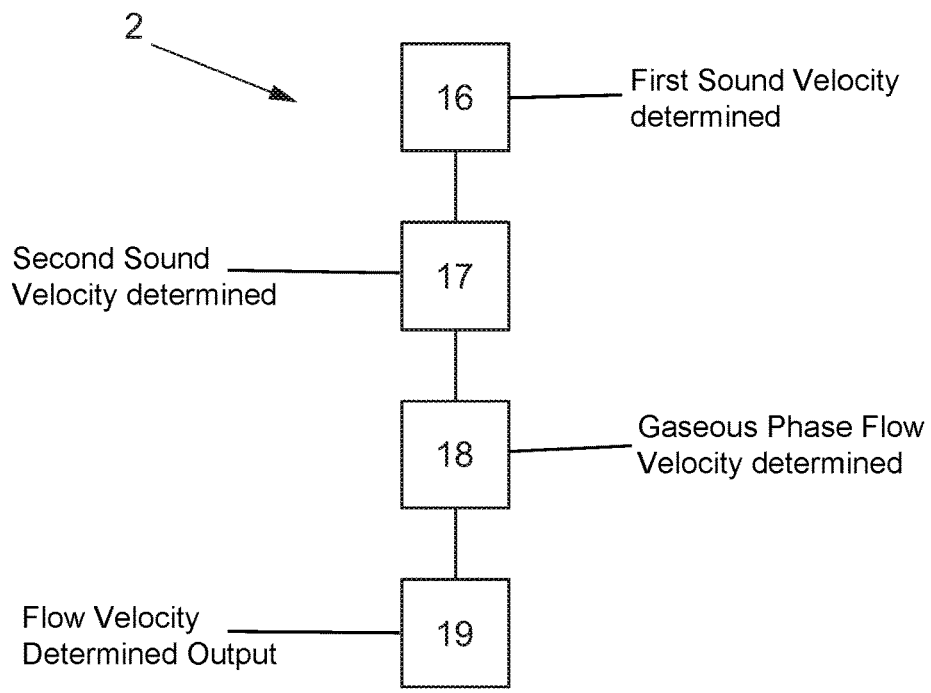
FIG. 3 is a flow chart of a first embodiment of a method according to the invention for operating an ultrasonic flowmeter.

FIG. 3 shows a first embodiment of a method 2 for operating an ultrasonic flowmeter 1.

In a first step 16, a first sound velocity of a first measurement signal over the sound measuring section 11 of the first ultrasonic measuring unit 7 is determined and assigned to the gaseous phase if the first sound velocity is below a limiting sound velocity.

In a second step 17, a second sound velocity of a second measurement signal over the sound measuring section 12 of the second ultrasonic measuring unit 8 is determined and assigned to the gaseous phase if the second sound velocity is below a limiting sound velocity.

In a next step 18, if at least one of the sound velocities is assigned to the gaseous phase, a flow velocity of the gaseous phase is determined from the at least one sound velocity.

The flow velocity or velocities is/are then output 19 via a display unit or an interface for further evaluation.

Figure 4:
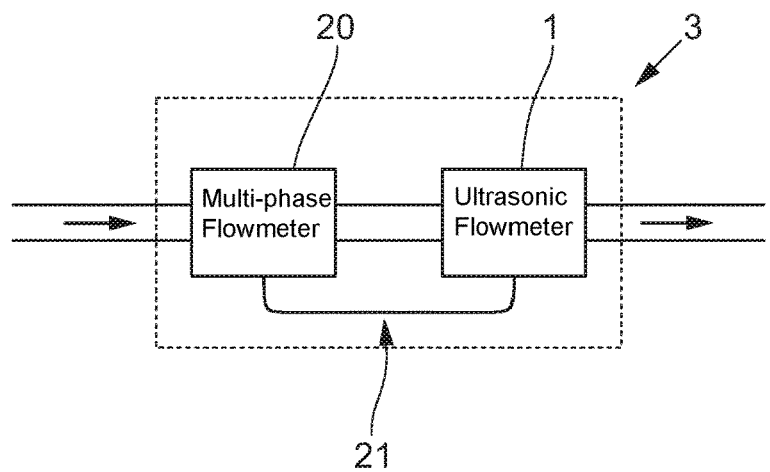
FIG. 4 is a schematic first embodiment of a measuring system according to the invention.

FIG. 4 schematically shows a first embodiment of a measuring system 3 consisting of a multi-phase flowmeter 20 and an ultrasonic flowmeter 1, wherein the ultrasonic flowmeter 1 is arranged downstream of the multi-phase flowmeter 20 when viewed in the direction of flow.

The multi-phase flowmeter 20 is connected to the ultrasonic flowmeter 1 via a, preferably wireless, communication system 21, so that the measuring devices 20, 1 can, for example, exchange measured values for further processing. This allows, on the one hand, the range of application of the measuring devices 1, 20 to be extended, and on the other hand, more information about the medium being measured to be determined.

Figure 5:
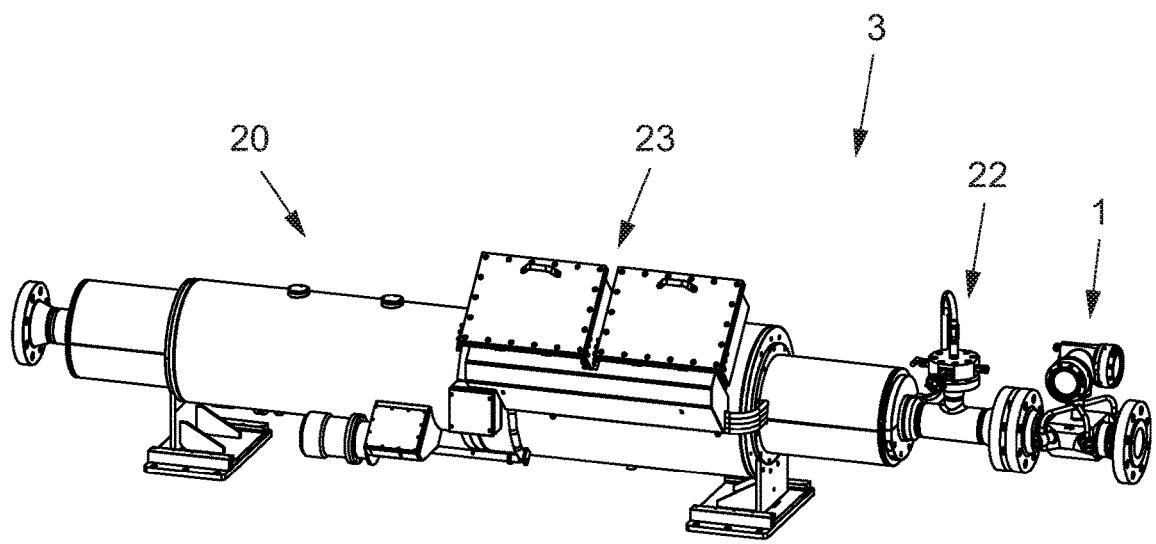
FIG. 5 is perspective view of a second embodiment of a measuring system and FIG. 6 is a flow chart of a first embodiment of a method according to the invention for operating a measuring system.

In the measuring system 3 shown in FIG. 5, the multi-phase flowmeter 20 is designed as a nuclear magnetic flowmeter. In addition, there is a pressure measuring device 22 for measuring the pressure inside the measuring tube. During operation of the measuring system 3, the flow velocity of the gaseous phase of the medium determined by the ultrasonic flowmeter 1 is transmitted to the control unit 23 of the nuclear magnetic flowmeter and further processed if the gas velocity is particularly high and/or if the pressure measured by the pressure measuring device 22 is particularly high.

Figure 6:
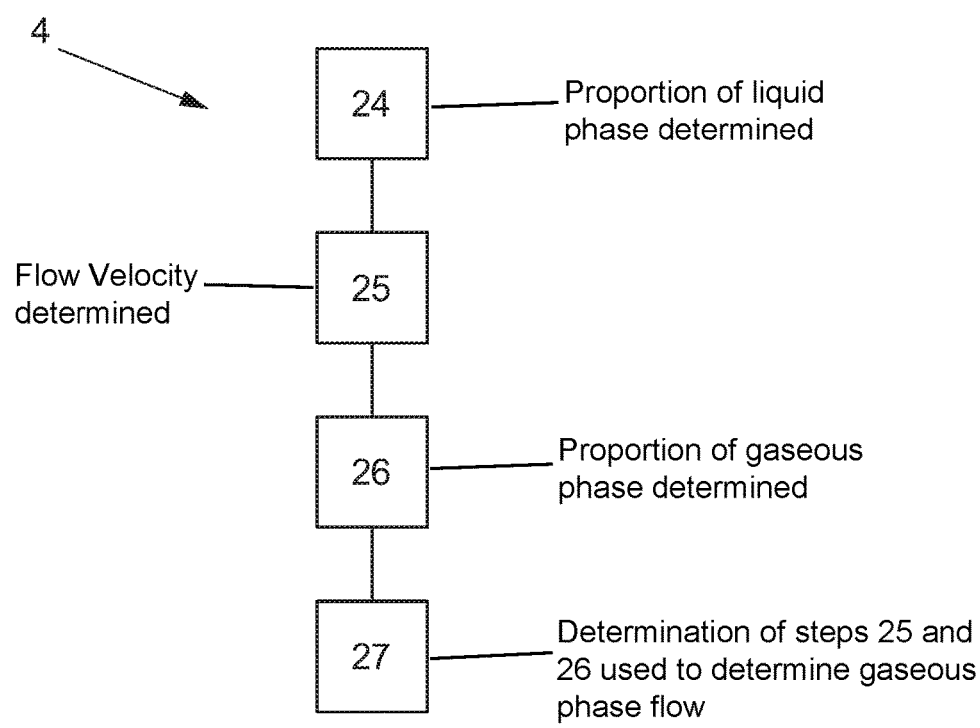

FIG. 6 shows a first embodiment of a method 4 for operating the measuring system 3.

In a first step, the multi-phase flowmeter 20 determines a proportion of the liquid phase in the total flow.

In a next step 25, which can also take place simultaneously, the ultrasonic flowmeter 1 determines a flow velocity of the gaseous phase.

In a next step 26, the proportion of the gaseous phase in the total flow is determined using the proportion of the liquid phase.

Finally, if the flow velocity of the gaseous phase determined by the ultrasonic flowmeter 1 is above a limiting flow velocity, the flow of the gaseous phase is determined using the flow velocity of the gaseous phase determined by the ultrasonic flowmeter 1 and the proportion of the gaseous phase 27.

As a result, the flow of the gaseous phase of a multi-phase medium can be reliably determined by this method even under critical conditions.

What is claimed is:

1. A method for operating an ultrasonic flowmeter having a measuring tube, a control unit and at least one first ultrasonic measuring unit and a second ultrasonic measuring unit, wherein the measuring tube has a measuring tube interior and a measuring tube longitudinal axis, wherein each of the ultrasonic measuring units is arranged on the measuring tube, wherein each ultrasonic measuring unit comprises:

a first ultrasonic transducer and a second ultrasonic transducer, wherein the first and the second ultrasonic transducers of each ultrasonic measuring unit span a sound measuring section with a sound axis, and wherein the sound measuring section and the sound axis penetrate the measuring tube interior,
wherein the control unit is constructed for carrying out ultrasonic measurements with the ultrasonic measuring units, and
wherein the sound axis of the first ultrasonic measuring unit and the sound axis of the second ultrasonic measuring unit span a sound measuring plane which extends substantially parallel to the longitudinal axis of the measuring tube, the method comprising:
flowing a medium having at least one liquid and one gaseous phase through the measuring tube and assigning at least one of the first and second measuring units to measuring of the gaseous phase,
determining a first sound velocity of a first measurement signal in said sound measuring plane at a sound measuring section of the first ultrasonic measuring unit, and if the first sound velocity is below a limiting sound velocity then the first sound velocity is assigned to the gaseous phase,
determining a second sound velocity of a second measurement signal in said sound measuring plane at a sound measuring section of the second ultrasonic measuring unit, and if the second sound velocity is below the limiting sound velocity then the second sound velocity is assigned to the gaseous phase,
determining a flow velocity of the gaseous phase from at least one sound velocity determined for the gaseous phase.

2. The ultrasonic flowmeter according to claim 1, wherein the sound axis of the first ultrasonic measuring unit and the sound axis of the second ultrasonic measuring unit cross one another.

3. The ultrasonic flowmeter according to claim 2, wherein the sound measuring plane is above the measuring tube longitudinal axis.

4. The method according to claim 1, wherein both sound velocities are assigned to the gaseous phase, and said flow velocity is determined from both of the sound velocities.

5. The method according to claim 1, further comprising, after carrying out said method a first time, wherein at least one sound velocity is assigned to the gaseous phase, performing said method a second time without assigning said the first and second sound velocity to the gaseous phase, and
wherein a flow velocity of the gaseous phase is determined from the at least one sound velocity from the first time the method is carried out.

6. The method according to claim 5, wherein information about the flow is determined using at least one property of at least one of the first or the second measurement signal.

7. The method according to claim 1, wherein the presence of surges in the measuring tube is determined using at least one of the first or second sound velocity.

8. The method according to claim 1, wherein information about the composition of the gaseous phase is determined from the sound velocity of at least one of the first or the second measurement signal.

\* \* \* \* \*